(12) United States Patent
Shin et al.

(10) Patent No.: US 9,860,103 B2
(45) Date of Patent: Jan. 2, 2018

(54) METHOD AND APPARATUS FOR TRANSMITTING INTERFERENCE INFORMATION FOR NETWORK ASSISTED INTERFERENCE CANCELLATION AND SUPPRESSION IN WIRELESS COMMUNICATION SYSTEM

(71) Applicant: Samsung Electronics Co., Ltd., Gyeonggi-do (KR)

(72) Inventors: Cheolkyu Shin, Suwon-si (KR); Hyojin Lee, Suwon-si (KR); Yongjun Kwak, Yongin-si (KR); Younsun Kim, Seongnam-si (KR); Youngbum Kim, Seoul (KR); Juho Lee, Suwon-si (KR); Hyoungju Ji, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 89 days.

(21) Appl. No.: 14/663,737

(22) Filed: Mar. 20, 2015

(65) Prior Publication Data
US 2015/0271830 A1  Sep. 24, 2015

(30) Foreign Application Priority Data

Mar. 20, 2014 (KR) ........................ 10-2014-0032847

(51) Int. Cl.
*H04W 72/08* (2009.01)
*H04L 27/36* (2006.01)
(Continued)

(52) U.S. Cl.
CPC ............ *H04L 27/366* (2013.01); *H04L 1/206* (2013.01); *H04L 5/0073* (2013.01); *H04L 27/0012* (2013.01); *H04L 27/38* (2013.01)

(58) Field of Classification Search
None
See application file for complete search history.

(56) References Cited

U.S. PATENT DOCUMENTS

2007/0086541 A1  4/2007  Moon et al.
2010/0146351 A1  6/2010  Kakani et al.
(Continued)

FOREIGN PATENT DOCUMENTS

KR  20130108193  10/2013
WO  WO 2010/134755 A2  11/2010

OTHER PUBLICATIONS

International Search Report dated Jun. 12, 2015 in connection with International Application PCT/KR2015/002729, 3 pages.

*Primary Examiner* — Kouroush Mohebbi

(57) ABSTRACT

A method for transmitting interference related control information in order to improve a reception performance of a terminal that receives a downlink in a cellular mobile communication system based on the LTE-A system includes receiving a higher layer control message including probability information of a modulation scheme for an interference signal, from a base station, and performing error-correcting coding using a probability value of a modulation scheme for an interference signal, which is included in the higher layer control message. A base station in a mobile communication system, the base station includes a controller configured to generate probability information of a modulation scheme for an interference signal, and transmit, to the terminal, a higher layer control message comprising the probability information of the modulation scheme for the interference signal.

20 Claims, 13 Drawing Sheets

(51) Int. Cl.
    *H04L 1/20*     (2006.01)
    *H04L 5/00*     (2006.01)
    *H04L 27/00*     (2006.01)
    *H04L 27/38*     (2006.01)

(56) References Cited

U.S. PATENT DOCUMENTS

| | | |
|---|---|---|
| 2012/0051319 A1 | 3/2012 | Kwon et al. |
| 2012/0250803 A1 | 10/2012 | Ghazi-Moghadam et al. |
| 2013/0114437 A1* | 5/2013 | Yoo ................ H04J 11/005 370/252 |
| 2013/0250788 A1 | 9/2013 | Kim et al. |
| 2015/0172035 A1* | 6/2015 | Xu ................ H04L 5/0073 370/329 |

* cited by examiner

METHOD AND APPARATUS FOR TRANSMITTING INTERFERENCE INFORMATION FOR NETWORK ASSISTED INTERFERENCE CANCELLATION AND SUPPRESSION IN WIRELESS COMMUNICATION SYSTEM

CROSS-REFERENCE TO RELATED APPLICATION AND CLAIM OF PRIORITY

The present application is related to and claims priority from and the benefit under 35 U.S.C. §119(a) of Korean Patent Application No. 10-2014-0032847, filed on Mar. 20, 2014, which is hereby incorporated by reference for all purposes as if fully set forth herein.

TECHNICAL FIELD

The present disclosure relates to a method and an apparatus for transmitting interference related control information in order to improve reception performance of a UE which receives a downlink signal, in a cellular mobile communication system based on an Long Term Evolution-Advanced (LTE-A) system.

BACKGROUND

From the early stage of providing voice-oriented services, a mobile communication system has evolved into a high-speed and high-quality wireless packet data communication system to provide data and multimedia services. Various mobile communication standards such as High Speed Downlink Packet Access (HSDPA), High Speed Uplink Packet Access (HSUPA), Long Term Evolution (LTE), and Long Term Evolution-Advanced (LTE-A) of the 3rd Generation Partnership Project (3GPP), High Rate Packet Data (HRPD) of the 3rd Generation Partnership Project-2 (3GPP2), and IEEE 802.16 have recently been developed to support high-speed and high-quality wireless packet data transmission services. In particular, an LTE system is a system which is developed to efficiently support rapid wireless packet data transmission and maximizes a wireless system capacity using various wireless access technologies. An LTE-A system is a system which is obtained by improving the LTE system and has an improved data transmission capacity compared with the LTE system.

In general, the LTE refers to evolved Node B (eNB) and UE apparatuses corresponding to Release 8 or 9 of the 3GPP standard organization and the LTE-A refers to eNB and UE apparatuses corresponding to Release 10 of the 3GPP standard organization. After standardization of the LTE-A system, the 3GPP standard organization proceeds to standardize the following Release which is based on the same and has an improved performance.

Meanwhile, there has been researches conducted on converting the Code Division Multiple Access (CDMA), which is a multiple access scheme having used in the 2nd generation and the 3rd generation mobile communication system, into the Orthogonal Frequency Division Multiple Access (OFDMA) in the next generation system. Further, 3GPP and 3GPP2 have started their standardizations on the evolved systems using OFDMA. It is generally known that the OFDMA scheme, as compared with the CDMA scheme, can expect the capacity increase. One of several factors for causing the capacity increase in the OFDMA scheme is the ability to perform scheduling on the frequency axis (frequency domain scheduling). Although a capacity gain is acquired according to the time-varying channel characteristic using the channel-sensitive scheduling scheme, it is possible to obtain a higher capacity gain with use of the frequency-varying channel characteristic.

SUMMARY

In general, in a cellular mobile communication system, the interference is a factor which causes the most system performance deterioration, and system performance is determined depending on how to appropriately control the interference. An example of a method for controlling interference corresponds to the NAICS technology, an eNB shares some pieces of information on an interference signal with a UE through a network, and the UE applies the NAICS technology using the same. At this time, only when accurately and effectively determining the information on the interference signal, the UE can provide a mobile communication service which is improved through interference cancellation and suppression.

To address the above-discussed deficiencies, it is a primary object to provide a method and an apparatus for transmitting interference related modulation information in order to improve reception performance of a UE which receives a downlink signal, in a cellular mobile communication system based on an Long Term Evolution-Advanced (LTE-A) system.

Further, an aspect to the present disclosure is to provide a method and an apparatus for transmitting information on a modulation scheme of an interference signal in order to perform an effective NAICS operation.

The technical subjects pursued in the present disclosure may not be limited to the above mentioned technical subjects, and other technical subjects which are not mentioned may be clearly understood, through the following descriptions, by those skilled in the art of the present disclosure.

In order to achieve the above-described aspect, a communication method of a UE according to an embodiment of the present disclosure may include receiving a higher layer control message including probability information of a modulation scheme for an interference signal, from an eNB, and performing error-correcting coding using a probability value of a modulation scheme for an interference signal, which is included in the higher layer control message.

Further, the performing of the error-correcting coding includes receiving a physical layer control message including identification information of the probability information of a modulation scheme for an interference signal, from the eNB, identifying a probability value of a modulation scheme for an interference signal, which corresponds to the identification information of the probability information of a modulation scheme of an interference signal, in the higher layer control message, and performing error-correcting coding using the identified probability value of a modulation scheme for an interference signal.

Further, the probability information of a modulation scheme for an interference signal includes at least one of a probability value that the interference signal is modulated in QPSK, a probability value that the interference signal is modulated in 16QAM, and a probability value that the interference signal is modulated in 64QAM.

Further, the probability information of a modulation scheme for an interference signal further includes the number of possible modulation schemes of the interference signal and an index of the probability value of a modulation scheme for an interference signal.

Further, in the performing of the error-correcting coding, the error-correcting coding is performed using an equation:

$$LLR^{(k,i)} = \ln \frac{P(b_i = 0) \sum\limits_{m' \in M'} \sum\limits_{x_k \in S_i^0, x'_k \in X_{m'}} P(y_k | x_k, x'_k, m')P(m')}{P(b_i = 1) \sum\limits_{m' \in M'} \sum\limits_{x_k \in S_i^1, x'_k \in X_{m'}} P(y_k | x_k, x'_k, m')P(m')}$$

wherein $x_k$ denotes a signal transmitted to a UE, $x'_k$ denotes an interference signal, $s^i_0$ and $s^i_1$ denote a gray mapping set for $x_k$ of all possible cases, m' denotes a modulation scheme of an interference signal, M' denotes a set of all possible modulation schemes for an interference signal x', $X_{m'}$ denotes a gray mapping set for $x'_k$ of all possible cases when modulation schemes are determined to be m', respectively, and P(m') denotes a probability value of a modulation scheme according to a modulation scheme m' of an interference signal.

Further, in order to achieve the above-described aspect, a communication method of an eNB according to an embodiment of the present disclosure may include: configuring probability information of a modulation scheme for an interference signal; and transmitting a higher layer control message including the probability information of a modulation scheme for an interference signal, to a UE.

Further, the communication method further includes: transmitting a physical layer control message including identification information of the probability information of a modulation scheme for an interference signal, to the UE.

Further, in order to achieve the above-described aspect, a UE according to an embodiment of the present disclosure may include a communication unit that transmits/receives a signal to/from an eNB; and a controller that makes a control to receive, from the eNB, a higher layer control message including probability information of a modulation scheme for an interference signal and perform error-correcting coding using a probability value of a modulation scheme for an interference signal, which is included in the higher layer control message.

Further, in order to achieve the above-described aspect, an eNB according to an embodiment of the present disclosure may include: a communication unit that transmits/receives a signal to/from a UE; and a controller that makes a control to configure probability information of a modulation scheme for an interference signal and transmit, to the UE, a higher layer control message including the probability information of a modulation scheme for an interference signal.

In accordance with an embodiment of the present disclosure, in a cellular mobile communication system based on an LTE-A system, a reception performance of a UE which receives a downlink can be improved. Further, the UE receives interference related control information from an eNB, thereby improving a reception performance of the UE. Accordingly, the UE cancels and suppresses interference, thereby improving a reception performance of the UE.

Further, in accordance with an embodiment of the present disclosure, the eNB notifies, to the UE, a probability value of a modulation scheme possible for an interference signal so that the UE can more accurately calculate an LLR.

Further, in accordance with an embodiment of the present disclosure, the eNB notifies, to the UE, a probability value of a modulation scheme possible for an interference signal, thereby reducing the signaling overhead.

Effects obtainable from the present disclosure may not be limited to the above mentioned effects, and other effects which are not mentioned may be clearly understood, through the following descriptions, by those skilled in the art of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 8 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies. Hereinafter, an embodiment of the present disclosure will be described in detail with reference to the accompanying drawings. In describing the present disclosure, a detailed description of related functions or configurations known in the art will be omitted when it is determined that the detailed description thereof may unnecessarily obscure the subject matter of the present disclosure. The terms which will be described below are terms defined in consideration of the functions in the present disclosure, and may be different according to users, intentions of the users, or customs. Therefore, the definitions of the terms should be determined based on the contents throughout the specification.

Further, although the following detailed description of embodiments of the present disclosure will be directed to an OFDM-based wireless communication system, in particular, the 3GPP EUTRA standard, it can be understood by those skilled in the art that the main gist of the present disclosure may also be applied to other communication systems having similar technical backgrounds and channel formats, with a slight modification, without substantially departing from the scope of the present disclosure.

Further, in the present disclosure, a control message can include a higher layer control message (signaling) and a physical layer control message. Further, the higher layer control message includes higher signaling, higher layer signaling, a higher layer control message, etc., and includes, for example, a Radio Resource Control (RRC) message. Further, the physical layer control message can include, for example, a PDCCH, etc.

Figure 1:
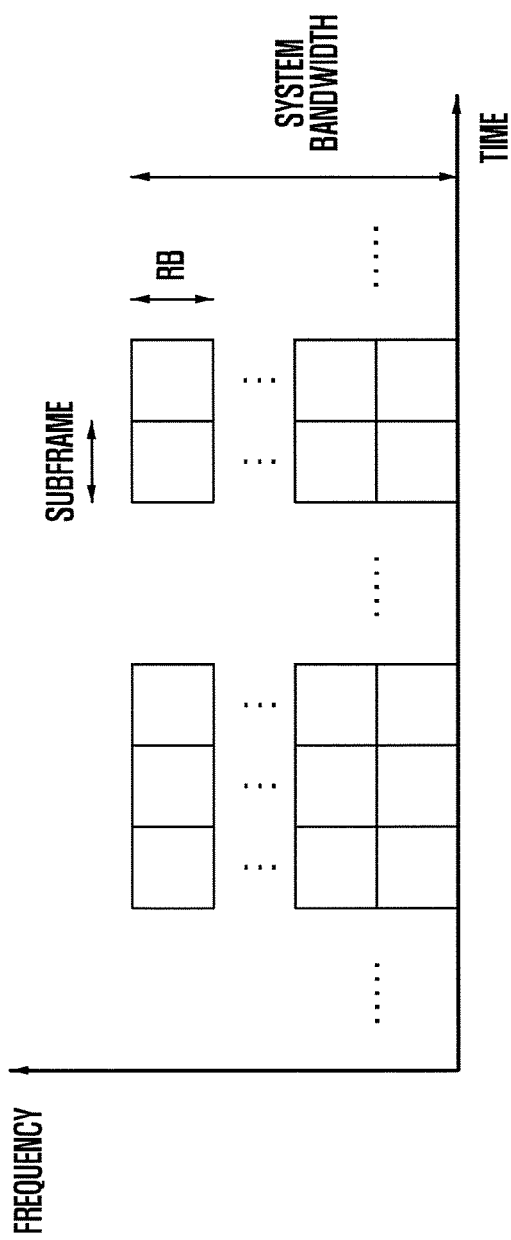
FIG. 1 illustrates a time-frequency resource in an LTE/LTE-A system.

FIG. 1 illustrates a time-frequency resource in an LTE/LTE-A system.

Referring to FIG. 1, a wireless resource, which an eNB transmits to an UE, is divided into Resource Blocks (RBs) unit on a frequency axis and is divided into sub-frame units on a time axis. In the LTE/LTE-A system, the RB generally includes 12 subcarriers and has a band of 180 kHz. In contrast, in the LTE/LTE-A system, the sub-frame generally includes 14 OFDM symbol intervals and occupies a time interval of 1 msec. When performing scheduling, the LTE/LTE-A system can assign a resource in a sub-frame unit on a time axis and assign a resource in an RB unit on a frequency axis.

Figure 2:
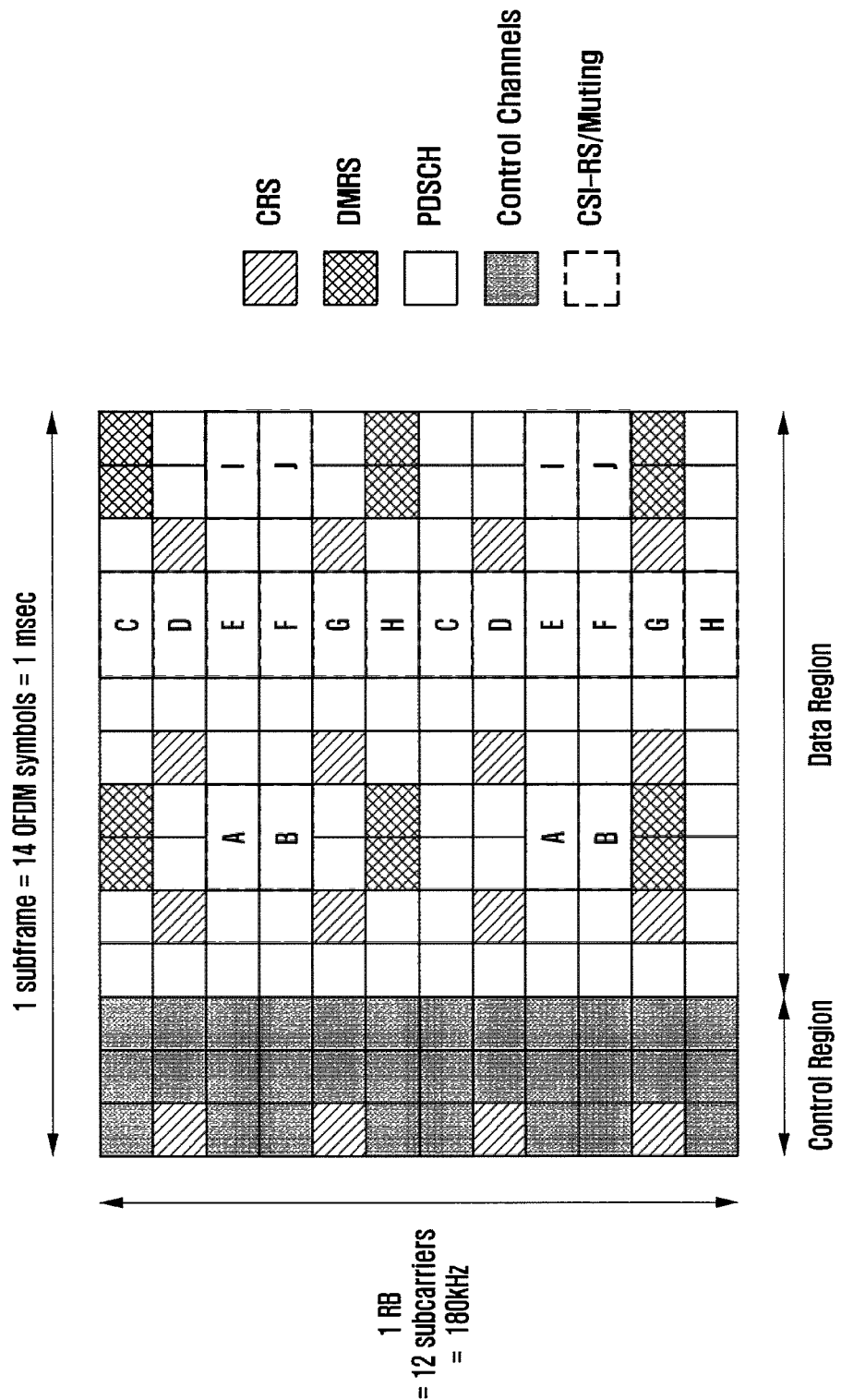
FIG. 2 illustrates a wireless resource of one sub-frame and one RB, which is a minimum unit schedulable in a downlink in the LTE/LTE-A system.

FIG. 2 illustrates a wireless resource of one sub-frame and one RB, which is a minimum unit schedulable in a downlink in the LTE/LTE-A system.

Referring to FIG. 2, a wireless resource includes one sub-frame on a time axis and one RB on a frequency axis. Such a wireless resource includes 12 subcarriers in a frequency domain, includes 14 OFDM symbols in a time region, and thus includes 168 inherent frequencies and time positions. In the LTE/LTE-A, each inherent frequency and time position illustrated in FIG. 2 is referred to as a Resource Element (RE). Further, one sub-frame includes two slots configured by 7 OFDM symbols, respectively.

In the wireless resource illustrated in FIG. 2, the following plurality of different kinds of signals may be transmitted.

CRS(Cell Specific Reference Signal): Reference signal transmitted to all UEs belonging to one cell.

DeModulation Reference Signal (DMRS): reference signal transmitted to a specific UE.

Physical Downlink Shared Channel (PDSCH): data channel transmitted via a downlink, which is used by an eNB to transmit traffic to a UE and is transmitted using an RE not used for reference signal transmission in the data region of FIG. 2.

Channel Status Information Reference Signal (CSI-RS): The CSI-RS is used in measuring a channel state of the reference signal transmitted to UEs belonging to one cell. A plurality of CSI-RSs can be transmitted to one cell.

Other control channels (PHICH, PCFICH, PDCCH): control channels for providing control information required for a UE to receive a PDSCH or transmitting ACK/NACK for operating HARQ for uplink data transmission.

In addition to the signals, the LTE-A system allows configuration of muting such that a CSI-RS transmitted from another eNB can be received without interference from UEs of a corresponding cell. The muting can be applied to a position at which a CSI-RS can be transmitted, and a UE generally skips a corresponding wireless resource to receive a traffic signal. In the LTE-A system, the muting is also referred to as a zero-power CSI-RS. This is because, by nature, the muting is applied to a CSI-RS position and transmission power is not transmitted.

As illustrated in FIG. 2, the CSI-RS can be transmitted using a part of positions marked by A, B, C, D, E, F, G, H, I, and J according to the number of antennas which transmit the CSI-RS. Further, the muting may be also applied to a part of the positions marked by A, B, C, D, E, F, G, H, I, and J. In particular, the CSI-RS may be transmitted to 2, 4, and 8 REs according to the number of antenna ports through which transmission is performed. For example, the CSI-RS is transmitted to half of the specific patterns in FIG. 2 when the number of antenna ports is 2, the CSI-RS is transmitted to the entirety of the specific patterns is used for CSI-RS transmission when the number of antenna ports is 4, and two patterns are used for CSI-RS transmission when the number of antenna ports is 8. Meanwhile, the muting is always performed in one pattern unit. That is, the muting may be applied to a plurality of patterns, but cannot be applied to only a part of one pattern when muting positions do not overlap CSI-RS positions. However, when the CSI-RS positions overlap the muting positions, the muting can be applied to a part of one pattern.

In a cellular system, a Reference Signal (RS) should be transmitted in order to measure a downlink channel state. In the case of the LTE-A system of the 3GPP, a terminal measures a channel status between a base station and the terminal using a Channel Status Information Reference Signal (CSI-RS) transmitted by the eNB. Several elements should be basically considered for the channel state, and herein, the elements include an amount of interference in a downlink. The interference in the downlink includes interference signals, thermal noise, etc. generated by antennas belonging to neighboring eNBs, and is an important factor when a UE determines a downlink channel condition. As one example, when a transmission antenna performs transmission from one personal eNB and a reception antenna performs transmission to one UE, the UE determines energy per one symbol which can be received via a downlink from a reference signal received from the eNB and an amount of interference to be simultaneously received at an interval which receives the corresponding symbol, thereby determining a Signal to Noise plus Interference Ratio (SNIR). The SINR corresponds to a value obtained by dividing a power of a received signal by an intensity of an interference and noise signal. In general, a relatively better reception performance and a relatively higher data transmission rate can be obtained as the SNIR increases. The determined SNIR or a value corresponding thereto or the maximum data transmission rate which can be supported by the corresponding SNIR is notified to the eNB, and thus, the eNB can determine which data transmission rate the eNB performs transmission to the UE.

In a case of a general mobile communication system, an eNB equipment is disposed at a central point of each cell, and the corresponding eNB equipment communicates with a UE using one or more antennas located in a limited place. A mobile communication system in which antennas belonging to one cell are arranged at the same location is referred to as a Centralized Antenna System (CAS). In contrast, a mobile communication system in which antennas (Remote Radio Heads; RRHs) belonging to one cell are arranged at distributed positions in the cell is referred to as a Distributed Antenna System (DAS).

Figure 3:
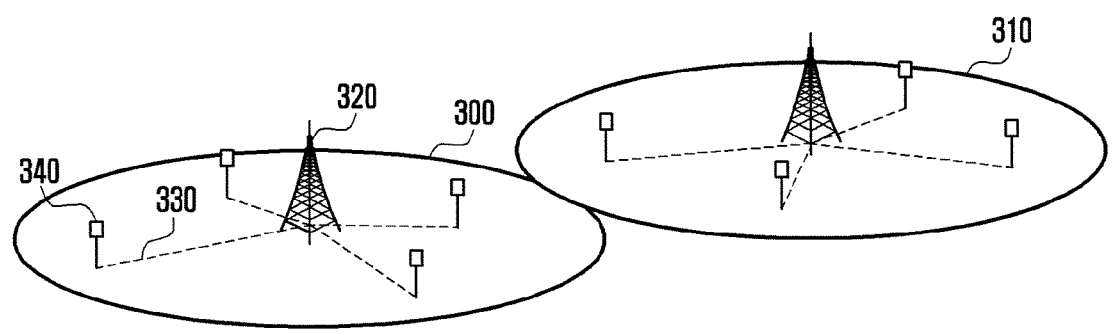
FIG. 3 illustrates an arrangement of antennas at distributed positions in a general DAS.

FIG. 3 illustrates an arrangement of antennas at distributed positions in a general DAS.

Referring to FIG. 3, a DAS formed by two cells 300 and 310 is illustrated. The cell 300 is formed by one high-power antenna 320 and four low-power antennas 340. The high-power antenna 320 provides a minimum service to the entire area included in a cell area. In contrast, the low-power antennas 340 can provide a service based on a high data rate to UEs limited in limited areas within a cell. Further, the high-power antenna 320 and the low-power antennas 340 can operate according to the scheduling and wireless resource allocation of a central controller while being connected to the central controller, as indicated by reference numeral 330. In the DAS, one or more antennas may be arranged at a location of an antenna which is geographically separated. As described above, in the present disclosure, in the DAS, an antenna or antennas arranged at the same location are called an antenna group (RRH group).

In the DAS as illustrated in FIG. 3, a UE receives a signal from one antenna group which is geographically separated, and a signal transmitted from other antenna groups acts as interference.

Figure 4:
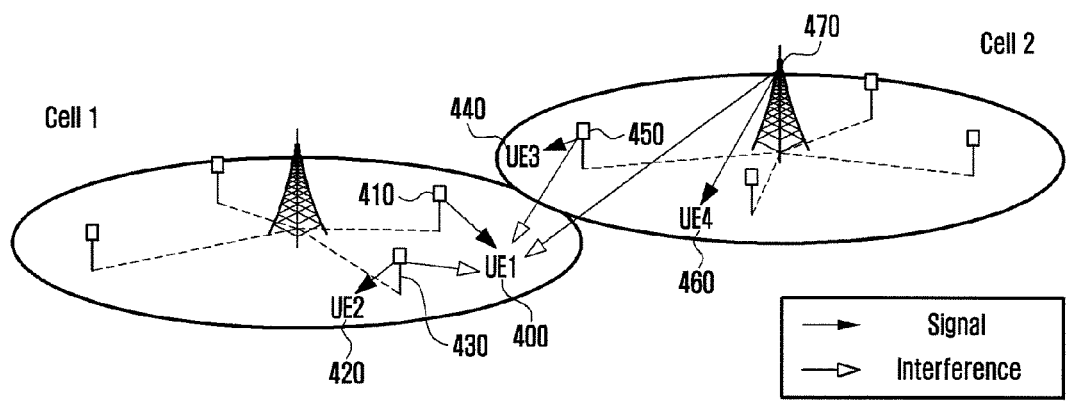
FIG. 4 illustrates an occurrence of interference in the case of transmission to different UEs according to each antenna group in the DAS.

FIG. 4 illustrates an occurrence of interference in the case of transmission to different UEs according to each antenna group in the distributed antenna system.

Referring to FIG. 4, a first UE (UE1) 400 receives a traffic signal from an antenna group 410. In contrast, a second UE (UE2) 420 receives a traffic signal from an antenna group 430, a third UE (UE3) 440 receives a traffic signal from an antenna group 450, and a fourth UE (UE4) 460 receives a traffic signal from an antenna group 470. The UE1 400 receives a traffic signal from the antenna group 410 while receiving interference from the other antenna groups 430, 450, and 470 which transmit a traffic signal to the other UEs 420, 440, and 460, respectively. That is, a signal transmitted from the antenna groups 430, 450, and 470 can cause an interference effect to the UE1 400.

In general, interference generated by another antenna group in a DAS includes two types of interference as follows.

Inter-cell interference: Interference generated between antenna groups belonging to different cells.

Intra-cell interference: Interference generated between antenna groups belonging to the same cell.

An example of intra-cell interference for the UE1 400 of FIG. 4 is interference generated in the antenna group 430 belonging to the same cell. Further, an example of inter-cell interference for the UE1 400 is interference generated between the antenna groups 450 and 470 belonging to neighboring cells. The inter-cell interference and the intra-cell interference are received by a UE at the same time so as to disturb data channel reception of the UE.

In general, when a UE receives a wireless signal, a desired signal is received together with noise and interference. That is, the reception signal can be expressed by Equation (1) as follows.

$$r = s + \text{noise} + \text{interference} \quad (1)$$

In Equation (1), "r" denotes a reception signal, "s" denotes a transmission signal, "noise" denotes noise having the Gaussian distribution, and "interference" denotes an interference signal generated in a wireless communication. The interference signal can be generated in the following situations.

Interference at neighboring transmission points: when a signal transmitted by a neighboring cell or a neighboring antenna in the DAS generates interference in a desired signal.

Interference at the same transmission point: when MU-MIMO transmission is performed at one transmission point using a plurality of antennas, when signals for different users generate interference therebetween A value of the SNIR is changed according to the magnitude of the interference, thereby influencing reception performance. In general, in a cellular mobile communication system, the interference is a factor which causes the most system performance deterioration, and system performance is determined depending on how to appropriately control the interference. In the LTE/LTE-A, introduction of various standard technologies for supporting a Network Assisted Interference Cancellation and Suppression (NAICS) technology has been considered to be methods for improving reception performance in a situation in which interference is generated. The NAICS technology is a technology in which an eNB transmits, to the corresponding UE, information relating to an interference signal, through a network so that the UE can restore a reception signal in consideration of characteristics of an interference signal. As an example, when the UE identifies a modulation scheme and a reception intensity of the interference signal, the UE cancels the interference signal or restores the reception signal in consideration of the interference signal, thereby improving reception performance.

A wireless communication system performs error correction coding in order to correct an error generated in a transmission/reception process. In the LTE/LTE-A system, a convolution code, a turbo code, etc. are used for the error correction coding. In order to improve decoding performance of the error-correction coding, a receiver uses not a hard decision but a soft decision when decoding a modulated modulation symbol such as QPSK, 16QAM, and 64QAM. When a transmission port transmits "+1" or "−1", a receiver employing the hard decision selects and outputs either "+1" or "−1" for a received signal. Contrarily, a receiver employing the soft decision outputs both information on which of "+1" and "−1" is received for a received signal and the reliability of the corresponding decision. Such reliability information can be used to improve decoding performance in the process of decoding.

A receiver employing the soft decision generally uses a log likelihood ratio (LLR) to calculate an output value. When the Binary Phase Shift Keying (BPSK) modulation scheme in which the transmission signal is either "+1" or "−1" is applied, the LLR is defined by Equation (2) as follows.

$$LLR = \log \frac{f(r|s=+1)}{f(r|s=-1)} \quad (2)$$

In Equation (2), "r" denotes a reception signal, and "s" denotes a transmission signal. Further, the conditional probability density function is a $f(r|s=+1)$ probability density function of the reception signal under a condition that "+1" is transmitted as the transmission signal. Likewise, the conditional probability density function $f(r|s=1)$ is a probability density function of the reception signal under a condition that "−1" is transmitted as the transmission signal. For any other modulation such as QPSK, 16QAM, or 64QAM, an LLR can also be represented by a mathematical expression in the same manner. The conditional probability density function has the Gaussian distribution when there is no interference.

Figure 5:
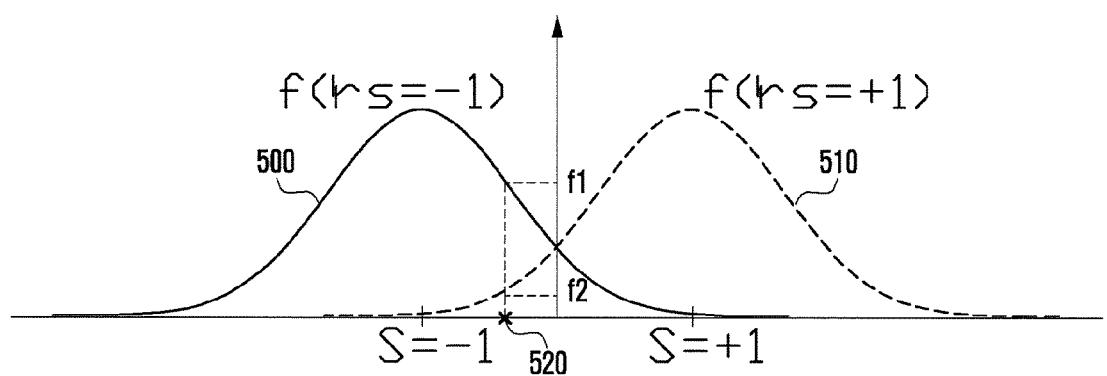
FIG. 5 illustrates a conditional probability density function.

FIG. 5 illustrates a conditional probability density function.

Referring to FIG. 5, a graph 500 corresponds to the conditional probability density function $f(r|s=1)$, and a graph 510 corresponds to the conditional probability density function $f(r|s=+1)$. For example, when a value of a reception signal is identical to a graph 520, a receiver calculates an LLR to log(f2/f1) using such conditional probability density functions. The conditional probability density functions as illustrated in FIG. 5 correspond to cases where noise and interference accord with the Gaussian distribution.

In a mobile communication system such as the LTE/LTE-A system, an eNB transfers, to the UE, several tens of bits or more of information in PDSCH transmission. At this time, the eNB encodes information to be transmitted to the UE, modulates the encoded information in schemes such as QPSK, 16QAM, and 64AQM, and then transmits the modulated information. As a result, the UE, which receives the PDSCH, generates LLRs for several tens or more of encoded symbols in the process of demodulating several tens or more of modulated symbols and transfers the generated LLRs to a decoder.

Figure 6:
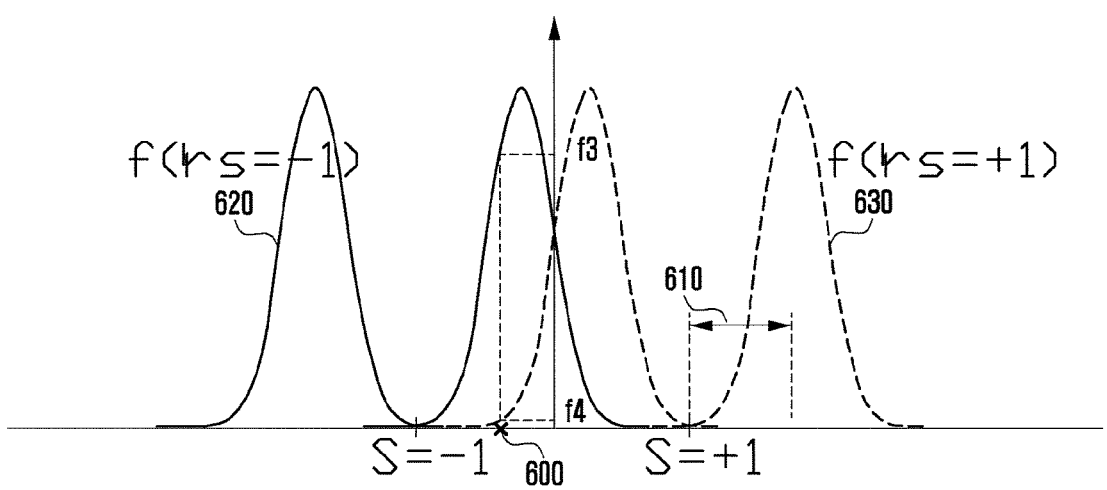
FIG. 6 illustrates a conditional probability density function when it is assumed that a reception signal is transmitted in the BPSK modulation scheme and an interference signal is also transmitted in the BPSK modulation scheme.

FIG. 6 illustrates a conditional probability density function when it is assumed that a reception signal is transmitted in the BPSK modulation scheme and an interference signal is also transmitted in the BPSK modulation scheme.

In general, noise accords with the Gaussian distribution, but interference may not accord with the Gaussian distribution depending on the situation. The typical reason why interference does not accord with the Gaussian distribution is that, dissimilar to noise, interference is a wireless signal for another receiver. That is, since "interference" in Equation (1) is a wireless signal for another receiver, the interference is transmitted in a state in which the modulation schemes such as BPSK, QPSK, 16QAM, and 64QAM are applied thereto. As an example, when an interference signal is modulated in the "BPSK", the interference has a probability distribution having a value of one of "+k" and "−k" in the same probability. Here, "k" is a value determined by the signal strength attenuation effect of a wireless channel.

Meanwhile, in FIG. 6, it is assumed that the noise accords with the Gaussian distribution.

The conditional probability density functions in FIG. 6 are different from the conditional probability density functions in FIG. 5. Referring to FIG. 6, a graph 620 corresponds to the conditional probability density function $f(r|s=1)$, and a graph 630 corresponds to the conditional probability density function $f(r|s=+1)$. Further, the amplitude in the graph 610 is determined according to the intensity of the interference signal and is determined according to the influence on a wireless signal. For example, when a value of a reception signal is identical to a graph 600, a receiver calculates an LLR to log(f4/f3) using such conditional probability density functions. Since the conditional probability density functions are different from each other, the LLR has a value different from that of the LLR in FIG. 5. That is, an LLR calculated in consideration of the modulation scheme of an interference signal is different from that calculated on the assumption of the Gaussian distribution.

Figure 7:
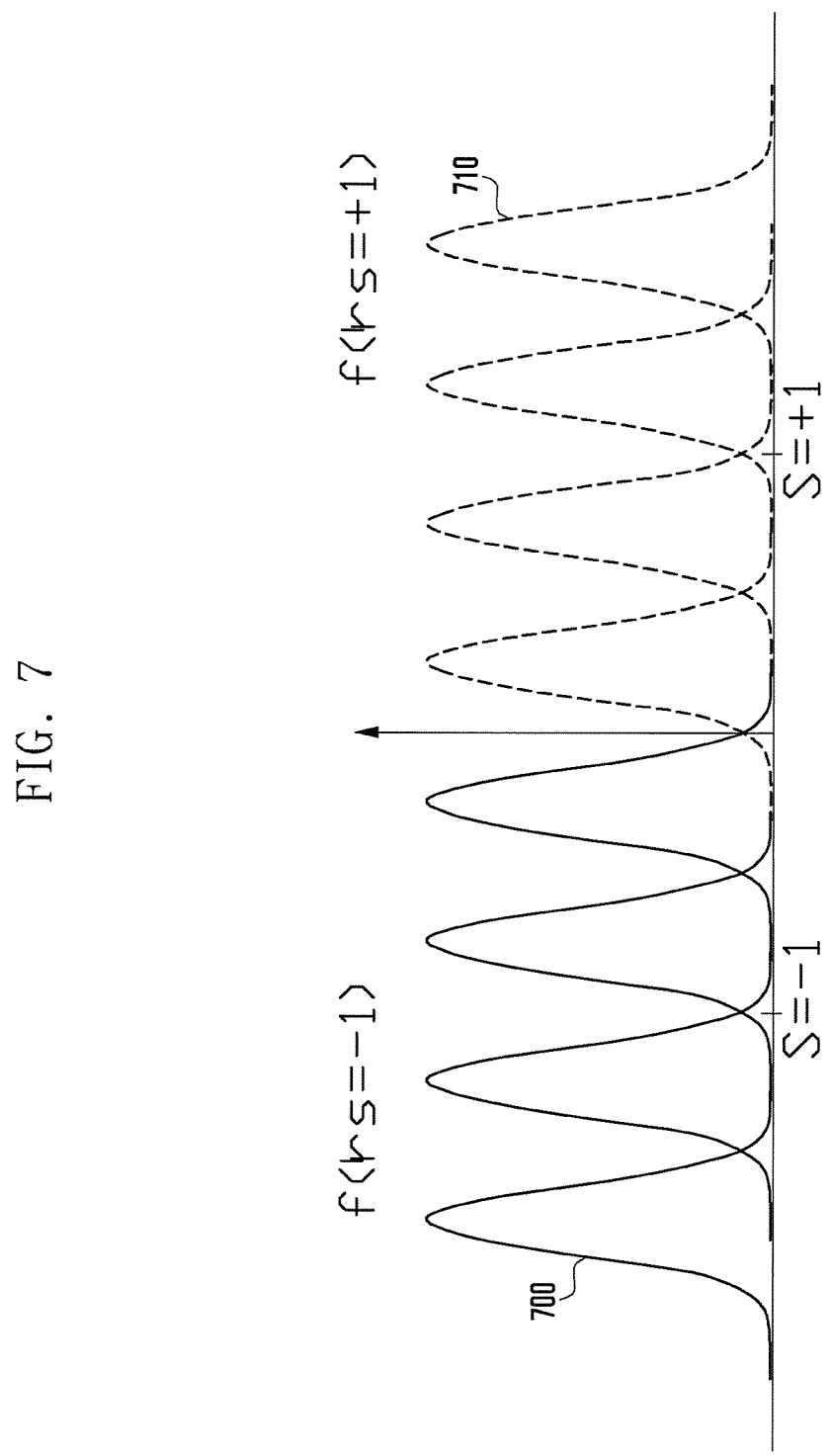
FIG. 7 illustrates a conditional probability density function when it is assumed that a reception signal is transmitted in the BPSK modulation scheme and an interference signal is also transmitted in the 16QAM modulation scheme.

FIG. 7 illustrates a conditional probability density function when it is assumed that when a reception signal is transmitted using the BPSK modulation scheme, an interference signal is transmitted using the 16QAM modulation scheme.

FIG. 7 illustrates that a conditional probability density function can change according to a difference in the modulation scheme of interference. In all examples illustrated in FIG. 6 and FIG. 7, a reception signal is transmitted in the BPSK modulation scheme. However, in FIG. 6, the interference corresponds to the BPSK, and in FIG. 7, the interference corresponds to 16QAM. That is, even when the modulation schemes of a reception signal are identical to each other, the conditional probability density functions differ from each other according to the modulation schemes of an interference signal, and as a result, the calculated LLRs differ from each other.

As described in parts relating to FIGS. 5, 6, and 7, the LLR has different values according to how a receiver assumes and calculates the interference. In order to optimize reception performance, the LLR should be calculated using the conditional probability density function on which a statistical characteristic of actual interference is reflected. Otherwise, the LLR can be calculated after the interference signal is cancelled from the reception signal. For example, when interference is transmitted in the BPSK modulation scheme, the LLR is calculated on the assumption that the receiver transmits the interference in the BPSK modulation scheme. However, in a case where interference is transmitted in the BPSK modulation scheme, when the LLR is calculated without an interference cancellation procedure on the basis of an assumption that the interference in the receiver has the Gaussian distribution or is transmitted in the 16QAM modulation scheme, a non-optimized LLR value is calculated, and thus, reception performance cannot be optimized.

Figure 8:
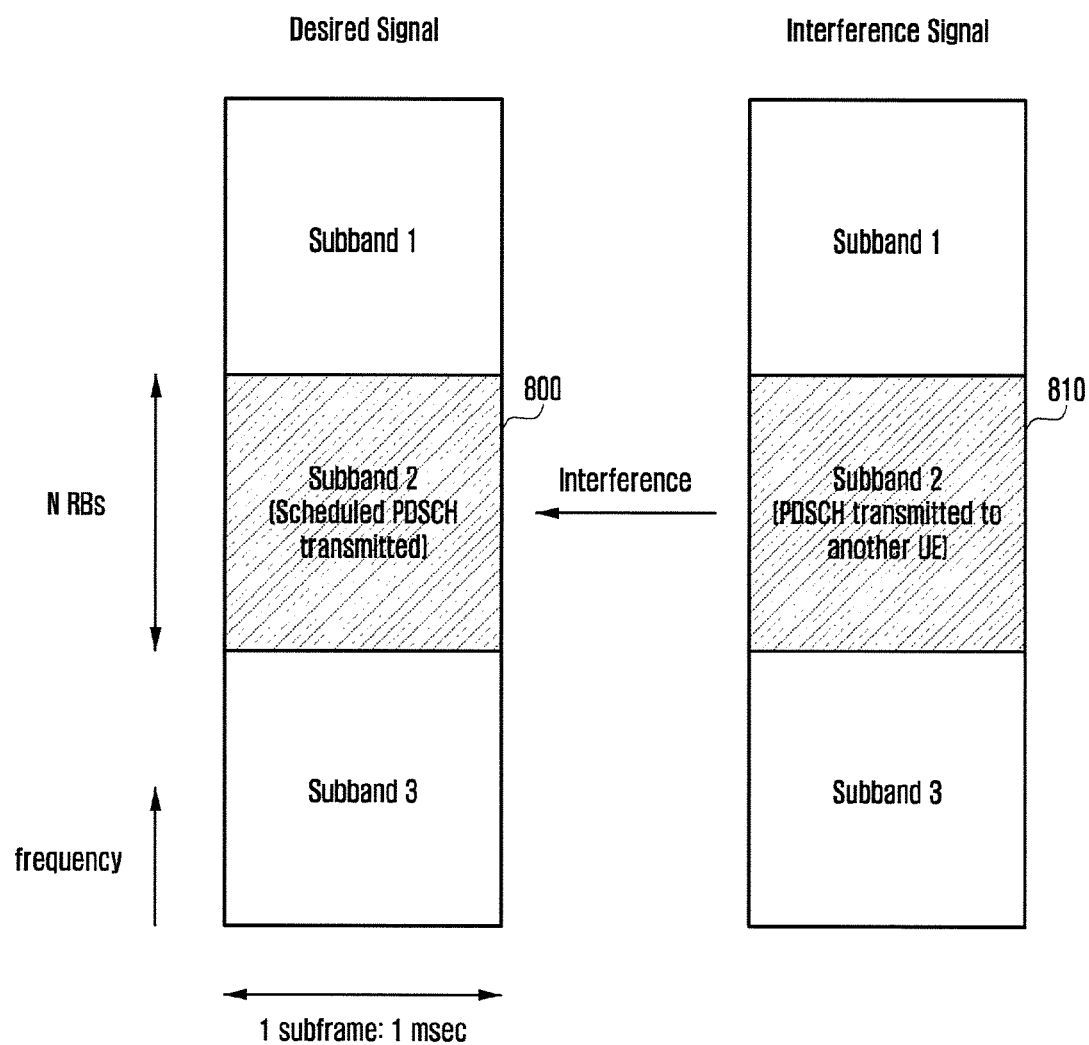
FIG. 8 illustrates a situation in which interference occurs in the LTE/LTE-A system according to an embodiment of the present disclosure.

FIG. 8 illustrates a situation in which interference occurs in the LTE/LTE-A system according to an embodiment of the present disclosure.

Referring to FIG. 8, a UE is to receive a wireless signal 800. At this time, an interference signal 810 which has been transmitted for other UEs generates interference with respect to the UE. In the LTE/LTE-A system, when a received signal and an interference signal are performed in the same frequency domain of the same sub-frame, such a phenomenon occurs. In an example illustrated in FIG. 8, it is assumed that a signal desired to be received by a UE and an interference signal are transmitted to N RBs.

In an embodiment of the present disclosure, methods for supporting the NAICS technology corresponding to a method for improving a reception performance of a UE by cancelling or suppressing interference in the LTE/LTE-A system will be considered and described. In FIG. 8, in order to improve a reception performance in a process of detecting the signal desired to be received by a UE, an LLR should be calculated after an interference signal 810 is cancelled or a conditional probability density function on which a statistical characteristic of the interference signal 810 is reflected should be accurately identified. Here, the former method corresponds to a Symbol Level Interference Cancellation (SL-IC) receiver and the latter method corresponds to a Symbol Level Maximum Likelihood (SL-ML) receiver. In the case of the LTE/LTE-A system, in order to support the NAICS (SL-ML or SL-IC), the UE should be able to identify at least one of the following transmission parameters with respect to interference.

CRS(Cell-specific Reference Signal) information of interference cell:
 Cell identifier (cell ID)
 Number of CRS antenna ports
 MBSFN (Multicast/Broadcast over a Single Frequency Network) subframe information
 Information on ratio of energy per RE of Data RE (Resource Element) and CRS RE (data RE to CRS EPRE ratio)
 PA, PB as per [TS 36.213 Section 5.2]
Network deployment information of interference cell:
 Synchronization information between eNBs
 Cyclic prefix information
 Subframe (or slot) number information
 Transmission Mode (TM) of interference PDSCH
PDSCH related dynamic transmission information of interference:
 Control channel (PDCCH: Physical Downlink Control CHannel) transmission region (or data channel (PDSCH: Physical Downlink Shared CHannel) start symbol index)
 Modulation order
 RI (Rank Indication): Information on number of transmission streams of interference PDSCH
 PMI (Precoding Matrix Indicator): Precoding information of interference PDSCH
 DMRS antenna port information
 DMRS sequence information (virtual cell ID, scrambling ID)

A part of the transmission parameters for interference can be transmitted from the eNB to the UE through separate signaling. Further, other parts of the transmission parameters for interference can be directly detected by the UE using the Blind Detection (BD) scheme. Further, depending on embodiments, when an eNB signals, to a UE, a candidate set of possible values which the corresponding parameter can have with respect to a specific transmission parameter, the UE can detect a corresponding transmission parameter value of an interference signal using the BD among candidates of transmitted possible parameter values. In an embodiment of the present disclosure, a method for supporting an NAICS will be described while focusing on detecting of a modulation order of an interference signal among the transmission parameters.

At this time, information on a modulation scheme of an interference signal is required in order to efficiently implement the NAICS (SL-IC or SL-ML) which generates an LLR in consideration of an influence on interference.

First, in a method for a UE identifying a modulation scheme of an interference signal, the control information by which the eNB performs data (PDSCH) scheduling with respect to the UE can further include information on a modulation scheme of the interference signal 810 together with information on the wireless signal 800 to be transmitted to the UE.

In detail, in the existing LTE-A system, the control information by which the eNB performs PDSCH scheduling with respect to the UE is transmitted through the Physical Downlink Control CHannel or the enhanced PDCCH. Further, the corresponding scheduling information can be identical to TABLE 1, and all pieces of information are configured by pieces of information on the wireless signal 800 transmitted to the UE.

TABLE 1

| Information name | Description |
| --- | --- |
| Resource allocation information (RB assignment) | Location information of Resource Block (RB) of PDSCH transmitted to UE |
| MCS (Modulation and Coding Scheme) information | Information on modulation scheme and code rate of PDSCH transmitted to UE (corresponding MCS information can include only one piece of MCS information when one code word is transmitted and two pieces of MCS information when two code words are transmitted, according to a Multi-Input Multi-Output transmission situation. |
| Information on antenna port, scrambling id, number of layers | Information on antenna port number of DMRS for estimating channel through which PDSCH is transmitted, sequence, and number of transmission layers |
| ETC. | Transmission carrier index, HARQ index, and uplink control channel information, etc. |

Addition of 2 bit control information for transmitting a modulation scheme of an interference signal to a UE as in the following TABLE 2 to the existing control information can be considered in order to further transmit information on the modulation scheme of the interference signal 810 to the UE while the information is added to control information for performing PDSCH scheduling in the existing LTE-A system as in TABLE 1.

TABLE 2

| 2 bit control information | Notification content |
| --- | --- |
| 00 | Interference signal has been transmitted in QPSK modulation scheme |
| 01 | Interference signal has been transmitted in 16QAM modulation scheme |
| 10 | Interference signal has been transmitted in 64QAM modulation scheme |
| 11 | Interference signal has not been transmitted in specific modulation scheme |

The control information represented in TABLE 2 can be used for notifying which modulation scheme is used for transmitting an interference signal from an eNB to a UE through 2 bits. For example, the UE can assume that the interference signal is transmitted in the QPSK modulation scheme when a value of the control information is "00", the interference signal is transmitted in the 16QAM modulation scheme when the value of the control information is "01", and the interference signal is transmitted in the 64QAM modulation scheme when the value of the control signal is "10". Further, the UE can assume that the interference signal is not transmitted in a specific modulation scheme when the value of the control information is "11". In this way, notifying, by an eNB, a UE that the interference is not transmitted in a specific modulation scheme is useful in the following cases:

when there is no interference signal which largely influences the UE;

when an interference signal does not have a predetermined modulation scheme; and when an interference signal exists on a part of frequency domains of a reception signal.

In the above, when there is no interference signal which largely influences a UE, since a neighboring eNB does not transmit a signal, there is no interference signal. Further, when an interference signal does not have a predetermined modulation scheme, an interference signal has a plurality of modulation schemes in a frequency-time section occupied by a reception signal. As an example, when a UE receives a PDSCH from frequency domains RB1 and RB2, an interference signal from RB1 is transmitted in the QPSK modulation scheme but an interference from RB2 is transmitted in the 16QAM modulation scheme. Further, when an interference signal exists on a part of a frequency domain of a reception signal, the value "11" of the control information is used to notify a UE that the interference signal is not transmitted in a specific modulation scheme.

Information having 1 bit as in TABLE 1 can be considered as yet another example for transmitting information on a modulation scheme to a UE. In this case, 1 bit can be used for notifying whether a UE applies the NAICS technology or not. In the corresponding example, when control information stating "an interference signal is transmitted in one specific modulation scheme" is notified to a UE, the UE can apply possible modulation schemes, and then determine a modulation scheme for interference having the largest reliability, thereby directly detecting a modulation scheme for interference. Further, when control information stating "an interference signal is not transmitted in a specific modulation scheme" is notified to a UE, the control information can be interpreted as in TABLE 2. That is, this case can be interpreted to be a case where there is no interference signal which largely influences a UE, a case where an interference signal does not have a predetermined modulation scheme, or a case where an interference signal exists on a part of a frequency domain of a reception signal.

TABLE 3

| 1 bit control information | Notification content |
| --- | --- |
| 0 | Interference signal is transmitted in one specific modulation scheme |
| 1 | Interference signal is not transmitted in specific modulation scheme |

Meanwhile, depending on embodiments, when a UE supports the NAICS technology in consideration of an interference signal configured by two code words, a method for dynamically identifying a modulation scheme of an interference signal using a control channel as described in the above can require control information having a large number of bits. For example, TABLE 4 corresponds to an example of control information having 4 bits to identify a modulation scheme of an interference signal when two codewords are considered.

TABLE 4

| 4 bit control information | Notification content |
| --- | --- |
| 0000 | Interference signal is transmitted in QPSK modulation scheme with respect to first codeword<br>Interference signal is transmitted in QPSK modulation scheme with respect to second codeword |
| 0001 | Interference signal is transmitted in QPSK modulation scheme with respect to first codeword<br>Interference signal is transmitted in 16QAM modulation scheme with respect to second codeword |
| 0010 | Interference signal is transmitted in QPSK modulation scheme with respect to first codeword<br>Interference signal is transmitted in 64QAM modulation scheme with respect to second codeword |
| 0011 | Interference signal is transmitted in 16QAM modulation scheme with respect to first codeword<br>Interference signal is transmitted in QPSK modulation scheme with respect to second codeword |
| 0100 | Interference signal is transmitted in 16QAM modulation scheme with respect to first codeword<br>Interference signal is transmitted in 16QAM modulation scheme with respect to second codeword |
| 0101 | Interference signal is transmitted in 16QAM modulation scheme with respect to first codeword<br>Interference signal is transmitted in 64QAM modulation scheme with respect to second codeword |
| 0110 | Interference signal is transmitted in 64QAM modulation scheme with respect to first codeword<br>Interference signal is transmitted in QPSK modulation scheme with respect to second codeword |
| 0111 | Interference signal is transmitted in 64QAM modulation scheme with respect to first codeword<br>Interference signal is transmitted in 16QAM modulation scheme with respect to second codeword |
| 1000 | Interference signal is transmitted in 64QAM modulation scheme with respect to first codeword<br>Interference signal is transmitted in 64QAM modulation scheme with respect to second codeword |
| 1100 | RESERVED |
| 1101 | |
| 1011 | |
| 1001 | |
| 1010 | |
| 1110 | |
| 1111 | Interference signal is not transmitted in specific modulation scheme |

Further, when different modulation schemes are applied to an interference signal for each RB or when two codewords are transmitted while different modulation schemes are applied for each RB, the required number of bits of control information increases exponentially.

In order to solve the above-described problem, the present disclosure proposes a method for notifying a UE of a probability value of a possible modulation scheme in a semi-static scheme without directly notifying a modulation scheme applied to an interference signal every time PDSCH scheduling occurs as in TABLE 2, TABLE 3, and TABLE 4. Here, the probability value of a possible modulation scheme for an interference signal is named a Probability of Modulation Order (PoMO). In other words, the eNB does not limit modulation for an interference signal to a specific modulation scheme, and allows the UE to identify influence on an interference signal using a probability value of a possible modulation scheme. Further, the UE receives PoMO information to calculate an LLR in consideration of a statistical characteristic of interference.

For example, an interference signal is transmitted using two codewords and another modulation scheme can be applied for each RB at the same time. At this time, TABLE 5 represents an example where PoMO information on a modulation scheme of an interference signal is configured.

TABLE 5

| Modulation scheme of interference signal | PoMO value |
|---|---|
| QPSK | Probability value that interference signal is transmitted in QPSK modulation scheme |
| 16QAM | Probability value that interference signal is transmitted in 16QAM modulation scheme |
| 64QAM | Probability value that interference signal is transmitted in 64QAM modulation scheme |

The PoMO information of an interference signal represented in TABLE 5 can be used by the eNB to notify the UE which modulation scheme has a high probability that an interference signal influences the UE. For example, when a PoMO value for QPSK is configured to be 0.2, a PoMO value for 16QAM is configured to be 0.5, and a PoMO value for 64QAM is configured to be 0.3, the UE can assume that a probability that an interference signal is transmitted in 16QAM is 0.5 which is the highest value, a probability that an interference signal is transmitted in 64QAM is 0.3, and a probability that an interference signal is transmitted in QPSK is 0.2. In particular, the feature wherein the eNB notifies the UE of information on an interference signal using the PoMO information can be useful when the interference signal is does not have a predetermined modulation scheme. For example, when an interference signal has different modulation schemes for each RB, if the modulation schemes applied to the interference signal is notified to each RB, the required number of bits of control information can increase exponentially. Thus, in TABLE 2, TABLE 3, and TABLE 4, the control information includes the content "an interference signal is not transmitted in a specific modulation scheme", and in this case, the NAICS is not applied. Further, a method in which an eNB makes a limitation to use only a specific modulation scheme through configuring the PoMO value for an interference signal can be considered. In other words, in a case where a probability value of a specific modulation scheme is configured to be 1, this case corresponds to that the specific modulation scheme of an interference signal is transmitted to the UE using the method represented in TABLE 2, TABLE 3, or TABLE 4.

Next, a method of receiving PoMO information by a UE according to the present disclosure will be described below.

Receive PoMO information using Radio Resource Control (RRC)

Receive PoMO information units RRC and PDCCH control channel

First, a method of receiving PoMO information using only RRC corresponds to a method of semi-statically performing signaling for an NAICS. In other words, the eNB can determine a PoMO configuration value pre-configured for RRC as a PoMO value for an interference signal of a currently-scheduled PDSCH without separately using a control channel whenever the RRC is signaled and transfer the determined value to the UE.

In the second method, the eNB can receive PoMO information using RRC and a PDCCH control channel at the same time, thereby dynamically performing signaling for the NAICS. Firstly, the UE can identify downlink control information transmitted through a PDCCH, read a PoMO related information value included therein, and compare a preset PoMO configuration value with the PoMO related information value using the RRC. Therefore, the PoMO value for interference of currently-scheduled PDSCH can be dynamically allocated to the UE. A detailed description thereof will be made below.

Using the above-described method, the UE, which has received the PoMO information, can determine which modulation scheme is used for transmitting an interference signal which acts as interference with respect to a reception signal thereof and the probability that the interference has been transmitted.

Figure 9:
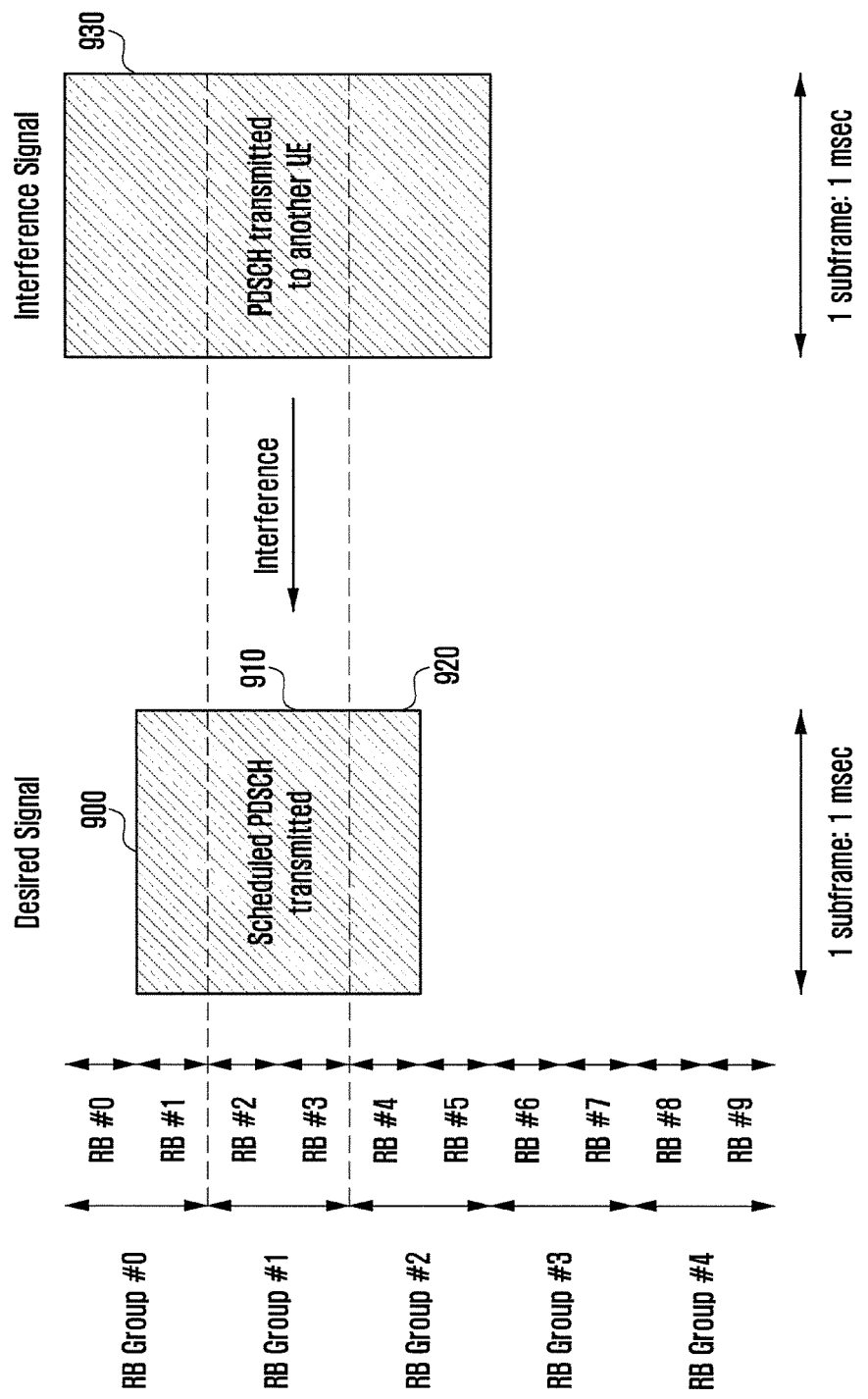
FIG. 9 illustrates a method for a UE receiving PoMO information relating to a modulation scheme of an interference signal and then applying an NAICS technology using the same.

FIG. 9 illustrates a method for a UE receiving PoMO information relating to a modulation scheme of an interference signal and then applying an NAICS technology using the same.

Referring to FIG. 9, the UE receives PDSCHs 900, 910, and 920 from frequency domains of RB1, RB2, RB3, and RB4. At this time, an interference signal 930 which interferes with a reception signal of the UE can be received at the same time. At this time, the UE, which has received the PoMO information on interference, can determine a probability value for a possible modulation scheme of an interference signal. Further, the UE can individually measure an interference signal in frequency domains 900, 910, and 920 on the basis of the determined probability value. Thereafter, the UE can generate LLRs for the PDSCHs received from the frequency domains 900, 910, and 920 using the measured interference signal. At this time, it is considered that an SL-ML receiver for calculating an LLR by calculating a conditional probability density function on which a statistical characteristic of domains 900, 910, and 920 is reflected is adopted or an SL-IC receiver for calculating an LLR after an interference signal of domains 900, 910, and 920 is cancelled in order to improve reception performance is adopted.

In the above description, the reason why the UE individually measures an interference signal from the frequency domains 900, 910, and 920 and generates LLRs is that wireless channels of the frequency domains can be different from each other due to influence on the frequency selective fading. That is, for example, a wireless channel in the RB1 can be different from a wireless channel in the RB2. In this way, when the wireless channels are different, statistical characteristics of interference can be different. In an embodiment of the present disclosure, to this end, the entire system bandwidth is divided into a plurality of Resource Block Groups (RBGs) and interference is individually measured for each RBG, thereby implementing the NAICS. As an example, in FIG. 9, in implementing the NAICS which generates an LLR in consideration of a statistical characteristic of interference, the UE can identify that the frequency domains 900, 910, and 920, from which PDSCHs are transmitted, belong to different RBGs when the interference is measured. That is, the UE can identify that the frequency domain 900 belongs to an RBG 1, the frequency domain 910 belongs to an RBG 2, and the frequency domain 920 belongs to an RBG 3. Further, the UE can individually measure interference by considering that the frequency domains belong to RBGs which are different from each other.

In the following first embodiment and second embodiment of the present disclosure, a method for a UE receiving PoMO information on an interference signal and determining a modulation scheme of an interference signal which influences a PDSCH to be received thereby, thereby effectively operating the NAICS will be described in detail.

First Embodiment

In an OFDM system, when an eNB transmits reference signals x0, x1, . . . , xK−1 through K different sub-carriers, if signals, which a UE receives through the K sub-carriers, are y0, y1, . . . , yK−1, a reception signal for a kth RE can be represented by Equation 3.

$$y_k = h_k x_k + h'_k x'_k + n_k \quad (3)$$

Here, $x_k$ and $h_k$ denote a signal transmitted to a UE and a channel component thereof, and $x'_k$ and $h'_k$ denotes a main interference signal and a channel component of the main interference signal. Further, $n_k$ corresponds to components of reception noise of the UE and remaining interference signals and can be modeled to be a probability variable having an independent Gaussian distribution. In all of the following equations including Equation 3, a transceiver assumed to have one antenna is modeled, but the same scheme can be expansively applied to a transceiver having a plurality of antennas.

At this time, when all main interference signal components are also assumed to be reception noise in Equation 3, Equation 3 can be represented to be Equation 4.

$$y_k = h_k x_k + v_k \tag{4}$$

Here, $v_k$ denotes a value obtained by adding an interference signal to reception noise of a UE, and is assumed to be a probability variable having the Gaussian distribution.

Finally, when the UE can completely cancel a main interference signal from the reception signal $y_k$ in Equation 3, Equation 3 can be modified into Equation 5 as follows:

$$\tilde{y}_k = y_k - h'_k x'_k = h_k x_k + n_k \tag{5}$$

In Equation 3, Equation 4, and Equation 5, an LLR can be used for calculating an output value of a soft decision for a reception signal. In the description based on Equation 3, the LLR can be defined to be Equation 6 as follows.

$$LLR^{(k,i)} = \ln \frac{P(b_i = 0 \mid y_k)}{P(b_i = 1 \mid y_k)} = \ln \frac{P(y_k \mid b_i = 0) P(b_i = 0)}{P(y_k \mid b_i = 1) P(b_i = 1)} \tag{6}$$

Here, $b_i$ denotes an i-th bit of a transmitted signal $x_k$.

At this time, Equation 6 can be modeled to be Equation 7 in consideration of a modulation scheme for an interference signal.

$$LLR^{(k,i)} = \ln \frac{P(b_i = 0) \sum_{m' \in M'} \sum_{x_k \in S_i^0, x'_k \in X_{m'}} P(y_k \mid x_k, x'_k, m') P(m')}{P(b_i = 1) \sum_{m' \in M'} \sum_{x_k \in S_i^1, x'_k \in X_{m'}} P(y_k \mid x_k, x'_k, m') P(m')} \tag{7}$$

Here, $s_i^0$ and $s_i^1$ are gray mapping sets for $x_k$ of all possible cases where $b_i$ is 0 or 1 in Equation (6), m' denotes a modulation scheme of an interference signal, and M' denotes a set of all possible modulation schemes for an interference signal x'. Further, $X_{m'}$ denotes a gray mapping set for $x'_k$ of all possible cases when modulation schemes are determined to be m', respectively. Further, P(m') denotes a PoMO value according to a modulation scheme m' of an interference signal. For example, when $x_k$ is modulated in QPSK, $s_1^0 = \{01,00\}$, $s_1^1 = \{10,11\}$, $s_2^0 = \{00,10\}$, $s_2^1 = \{01,11\}$. Further, in the LTE/LTE-A system, M'={QPSK, 16QAM, 64QAM}.

When an LLR is calculated on the basis of Equation 4, since all interference signals are assumed to be noise, the LLR can be calculated through Equation 6. However, when all the interference signals are assumed to be noise, if the magnitude of the interference signal is large, the LLR can be calculated very inaccurately through Equation 6.

In another method, when an LLR is calculated on the basis of Equation 5, since an interference signal is cancelled by a reception port in advance, the LLR can be calculated through Equation 6. Such a receiver which cancels an interference signal from a reception signal, calculates an LLR, and then applies the NAICS technology is called an SL-IC receiver. In comparison with this, a receiver which calculates an LLR from Equation 7 by considering a modulation scheme for an interference signal on the basis of Equation 3, and applies the NAICS technology is called an SL-ML receiver. In this way, when the SL-IC receiver or the SL-ML receiver is applied, an LLR can be calculated more accurately by considering influence on an interference signal.

When an eNB transmits PoMO information on a modulation scheme of an interference signal to a UE, the UE can apply the SL-IC receiver or the SL-ML receiver using the same. At this time, a method of signaling PoMO through only RRC in order to solve the signaling overhead problem through a control channel can be considered to be one of methods of signaling PoMO. In another method, an eNB can dynamically signal PoMO to a UE using both RRC and a control channel (this content will be described in the below second embodiment in detail).

In detail, a method for a UE applying an SL-IC receiver or an SL-ML receiver using PoMO information will be described below. For example, when the SL-ML receiver is applied, an LLR can be calculated by substituting PoMO information for Equation 7. Otherwise, after the BD is performed and a modulation scheme of an interference signal is detected, the LLR can be calculated from Equation 7 with respect to the determined modulation scheme of an interference signal. When the SL-IC receiver is applied, if a modulation scheme of an interference signal is detected through the BD, an interference signal can be cancelled from a reception signal and the LLR can be calculated through Equation 6. When the BD is performed, if the PoMO is used, the SL-IC receiver or the SL-ML receiver can be advantageously and more accurately applied. In general, the BD method can be represented by Equation 8.

$$\hat{m}' = \arg\max_{m' \in M'} \sum_{k=1}^{N_{RE}} P(y_k \mid \hat{x}_k, \hat{x}'_k, m') P(m') \tag{8}$$

Here, $N_{RE}$ denotes the number of REs. Further, $\hat{x}_k$ and $\hat{x}'_k$ denote a transmission signal and an interference signal detected through the ML, and can be calculated through Equation (9).

$$f(\hat{x}, \hat{x}' \mid m, m') = \operatorname*{argmin}_{x_k \in X_m, x'_k \in X_{m'}} \|y_k - h_k x_k - h'_k x'_k\| \tag{9}$$

Here, $X_m$ and $X_{m'}$ denote gray mapping sets for $x_k$ and $x'_k$ of all possible cases when the modulation schemes are determined to be m and m', respectively.

In Equation 8, when there is no PoMO information, it is assumed that all possible modulation schemes are generated at the same rate of probability. In contrast, when the PoMO of an interference signal is given, the modulation scheme of an interference signal can be more accurately detected by substituting the PoMO for P(m') in Equation 8.

Hereinafter, a method for a UE receiving signaling of a probability for a modulation scheme of an interference signal using RRC in order to calculate an LLR of a signal received when receiving specific PDSCH scheduling according to a first embodiment of the present disclosure will be described in detail.

Figure 10:
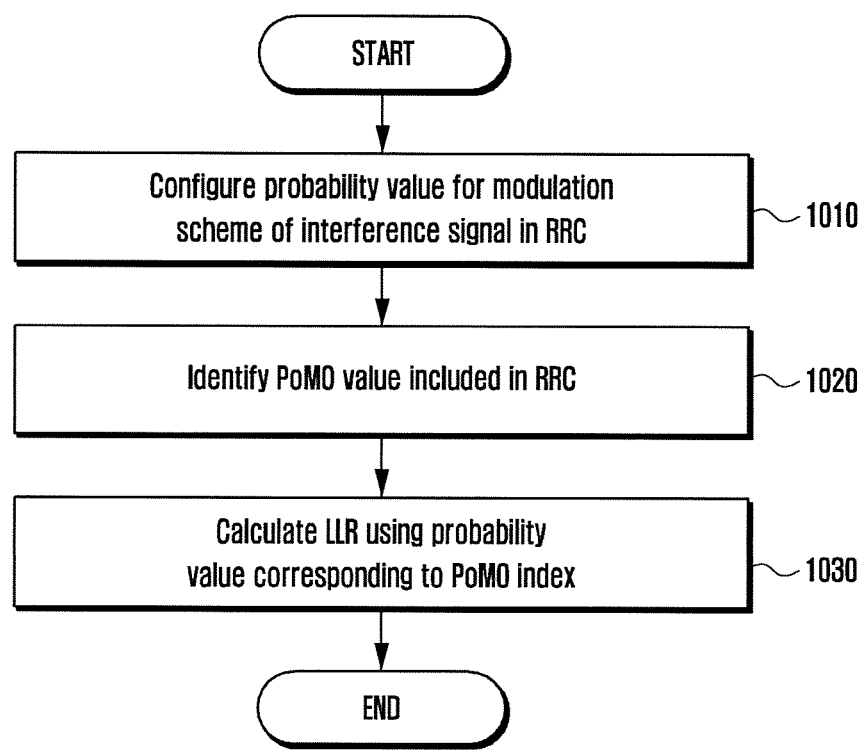
FIG. 10 is a flowchart illustrating a method for cancelling an interference signal using PoMO information according to an embodiment of the present disclosure.

FIG. 10 is a flowchart illustrating a method for cancelling an interference signal using PoMO information according to an embodiment of the present disclosure.

Referring to FIG. 10, a UE can receive signaling of a probability for a modulation scheme of an interference signal using RRC in order to calculate an LLR of a signal received when receiving specific PDSCH scheduling. In this case, an additional control channel resource for signaling PoMO of an interference channel is not required to be used. That is, when RRC signaling is performed, the UE can receive PoMO information of a signal corresponding to interference so as to semi-statically apply the NAICS.

Referring to FIG. 10, in operation 1010, an eNB can configure PoMO information corresponding to a probability value for a modulation scheme of an interference signal, in RRC. Here, the RRC information for acquiring a probability for a modulation scheme of an interference signal can include the following information:

Probability that an interference signal is modulated in QPSK
Probability that an interference signal is modulated in 16QAM
Probability that an interference signal is modulated in 64QAM Here, the modulation scheme of an interference signal can be additionally included or deleted depending on a modulation scheme supported by the corresponding system. For example, when the modulation of an interference signal is configured to be QPSK, 16QAM, and 64QAM, a PoMO value of an interference signal can be configured by Equation (10) as follows.

$$\Omega = \{P_{QPSK} = \alpha, P_{16QAM} = \beta, P_{64QAM} = \gamma\} \quad (10)$$

For example, here, $\alpha$, $\beta$, $\gamma$ can be represented by real numbers from 0 to 1, respectively. Meanwhile, the eNB can consistently update PoMO for each modulation.

Thereafter, the UE proceeds to operation 1020 to identify a preset PoMO value using RRC and semi-statically apply the PoMO for interference in order to apply the NAICS to a currently-scheduled PDSCH. Finally, in operation 1030, the UE calculates an LLR using PoMO information on a modulation scheme of an interference signal, and terminates a PDSCH decoding process.

Meanwhile, a method of an eNB for making a limitation such that only one specific modulation scheme is used for the PoMO for an interference signal can be considered to be an additional operation. For example, when the modulation scheme for an interference signal is limited to QPSK, $\Omega = \{P_{QPSK} = 1, P_{16QAM} = 0, P_{64QAM} = 0\}$ can be configured in Equation 10. When the modulation scheme for an interference signal is limited to 16QAM, $\Omega = \{P_{QPSK} = 0, P_{16QAM} = 1, P_{64QAM} = 0\}$ is configured, and when the modulation scheme for an interference signal is limited to 64QAM, $\Omega = \{P_{QPSK} = 0, P_{16QAM} = 0, P_{64QAM} = 1\}$ is configured. In this case, in the methods represented in TABLE 2 to TABLE 4, the control information includes information on the modulation scheme of an interference signal, thereby obtaining the same result even without transmission. Further, when such a method is used, if the UE applies the SL-IC, the UE can advantageously perform the PDSCH decoding by cancelling an interference signal without performing the BD for a modulation degree.

[Second embodiment]

In a second embodiment of the present disclosure, dissimilar to the first embodiment, the PoMO for an interference signal can be signaled using the PPC and the PDCCH control channel at the same time.

Figure 11:
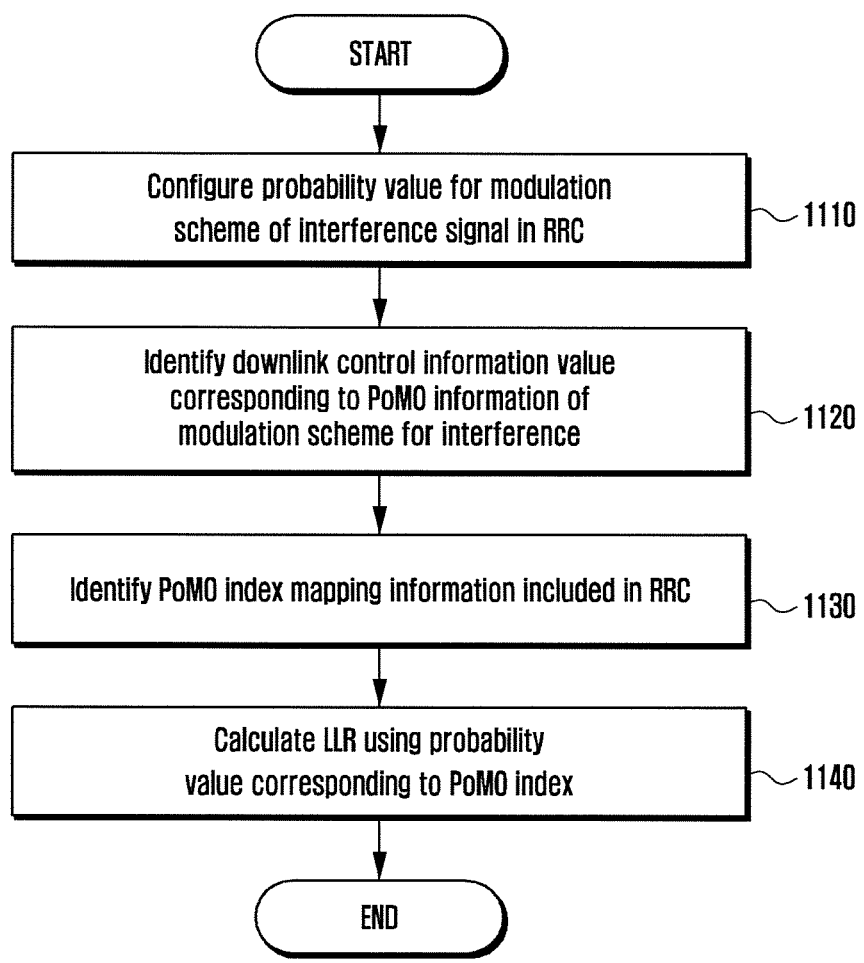
FIG. 11 is a flowchart illustrating a method for cancelling an interference signal using PoMO information according to another embodiment of the present disclosure.

FIG. 11 is a flowchart illustrating a method for cancelling an interference signal using PoMO information according to another embodiment of the present disclosure.

Referring to FIG. 11, a UE can receive signaling of PoMO for an interference signal using RRC and a PDCCH control channel at the same time. In this case, the UE can advantageously and dynamically signal the PoMO of an interference channel for a PDSCH using the PDCCH control channel. That is, the UE can receive signaling of a probability for a modulation scheme of an interference signal using the RRC and the PDCCH control channel in order to calculate an LLR of a signal received when receiving specific PDSCH scheduling.

Referring to FIG. 11, in operation 1110, an eNB can configure PoMO information corresponding to a probability value for a modulation scheme of an interference signal, in RRC. Here, the RRC information on a modulation scheme of an interference signal can include the following information:

The number of possible modulation schemes of interference signal
Probability value corresponding to PoMO index
Probability value that interference signal is modulated in QPSK
Probability value that interference signal is modulated in 16QAM
Probability value that interference signal is modulated in 64QAM Here, the modulation scheme of an interference signal can be additionally included or deleted depending on a modulation scheme supported by the corresponding system. For example, when the number of possible modulation schemes of an interference signal is three (3) and the modulation schemes are configured to be QPSK, 16QAM, and 64QAM, a probability value corresponding to a PoMO index or identification information j can be configured by Equation 11 as follows:

$$\Omega_j = \{P_{QPSK}{}^j = \alpha, P_{16QAM}{}^j = \beta, P_{64QAM}{}^j = \gamma\}, j=1, 2, \ldots, j=1,2,\ldots,J \quad (12)$$

For example, here, $\alpha$, $\beta$, $\gamma$ can be represented by real numbers from 0 to 1, respectively. Further, a J value can be configured considering signaling overhead through a control channel. In general, in a case of signaling within 2 bits, J is equal to 4. Meanwhile, the eNB can consistently update PoMO for each interference.

Thereafter, in operation 1120, the UE can identify a downlink control information value corresponding to PoMO information of a modulation scheme for interference. Further, in operation 1130, the UE can identify a probability value (PoMO) for a modulation scheme of an interference signal mapped to the corresponding PoMO index included in the RRC depending on the identified control information value.

For example, when the UE identifies, in operation 1120, that a downlink control information value corresponding to PoMO information is configured by 1 bit, the UE can configure each row in TABLE 6 through the RRC information as follows, in operation 1130. That is, when the downlink control information value corresponding to the PoMO information on interference is configured by 1 bit, two PoMOs can be configured in the RRC. For example, $\Omega_0 = \{P_{QPSK}{}^0 = \alpha_0, P_{16QAM}{}^0 = \beta_0, P_{64QAM}{}^0 = \gamma_0\}$ and $\Omega_1 = \{P_{QPSK}{}^1 = \alpha_1, P_{16QAM}{}^1 = \beta_1, P_{64QAM}{}^1 = \gamma_1\}$ can be configured. Further, when the downlink control information value corresponding to PoMO information is configured to be 0, the UE can identify a PoMO value $\Omega_0 = \{P_{QPSK}{}^0 = \alpha_0, P_{16QAM}{}^0 = \beta_0, P_{64QAM}{}^0 = \gamma_0\}$ corresponding to the first PoMO index in the RRC information.

TABLE 6

| PoMO information value for interference | Notification content |
| --- | --- |
| 0 | First PoMO index configured by RRC information |
| 1 | Second PoMO index configured by RRC information |

Further, when the downlink control information value corresponding to the PoMO information on a modulation scheme of an interference signal is configured by 2 bits, the UE can configure each row in TABLE 7 through the RRC, in operation 1130.

Meanwhile, depending on embodiments, one information value in TABLE 6 or TABLE 7 can be configured to be an operation in which a specific PoMO index is not included and the NAICS is not applied. Otherwise, when the PoMO index is not configured by the RRC, an information value corresponding thereto can be interpreted to be an operation in which the UE does not apply the NAICS.

TABLE 7

| PoMO information value for interference | Notification content |
| --- | --- |
| 00 | First PoMO index configured by RRC information |
| 01 | Second PoMO index configured by RRC information |
| 10 | Third PoMO index configured by RRC information |
| 11 | Fourth PoMO index configured by RRC information |

In other words, the UE proceeds to operation 1120 to identify downlink control information transmitted through a PDCCH in an actual PDSCH scheduling situation and read a PoMO information value of interference included therein, and proceeds to operation 1130 to identify the corresponding notification content in TABLE 6 or TABLE 7 pre-configured using the RRC. Further, the UE can dynamically apply PoMO of a modulation scheme for interference to be used to apply the NAICS to a currently-scheduled PDSCH. For example, when a downlink control information value corresponding to the PoMO information for interference is configured by 2 bits and the corresponding information value transmitted through a PDCCH is configured to be "01", the UE can interpret PoMO corresponding to a second PoMO index configured by the RRC as current PoMO for interference.

Thereafter, finally, in operation 1140, the UE calculates an LLR using PoMO information for a modulation scheme of an interference signal, and terminates a PDSCH decoding process.

Further, a method of an eNB for making a limitation such that only one specific modulation scheme is used for the PoMO for an interference signal can be considered to be an additional operation. When such a method is used, if the UE applies the SL-IC, the UE can advantageously perform the PDSCH decoding by cancelling an interference signal even without performing the BD for a modulation degree. Since this content is described in a part relating to the first embodiment, a detailed description thereof will be omitted.

Figure 12:
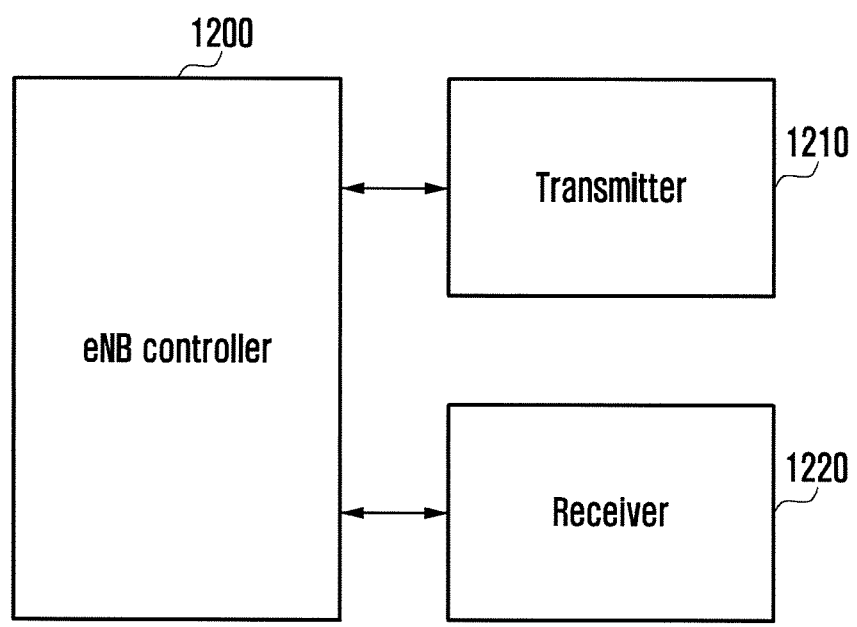
FIG. 12 is a block diagram illustrating an eNB according to an embodiment of the present disclosure.

FIG. 12 is a block diagram illustrating an eNB according to an embodiment of the present disclosure.

Referring to FIG. 12, an eNB according to an embodiment of the present disclosure can include a communication unit 1250; 1210 and 1220, and an eNB controller 1200 for controlling an overall operation of the eNB.

The eNB controller 1200 of the eNB controls the eNB to perform one operation of the above-described embodiments. For example, the eNB controller 1200 determines NAICS configuration, PDSCH scheduling, etc. of a UE. Further, the controller 1200 can make a control to configure probability information of a modulation scheme for an interference signal and transmit a higher layer control message including the probability information of a modulation scheme for an interference signal to the UE.

Further, the communication unit 1250 of the eNB transmits/receives a signal according to one operation of the above-described embodiments. At this time, the communication unit 1250 can include a transmitter 1210 and a receiver 1220 as illustrated in FIG. 12. For example, the NAICS configuration of the UE determined by the eNB can be notified to the UE through the transmitter 1210. Further, the transmitter 1210 can transmit control information and a PDSCH to the UE according to the determined PDSCH scheduling of the eNB. Further, the eNB can receive channel state information according to PDSCH transmission and the NAICS configuration of the UE using the receiver 1220.

Figure 13:
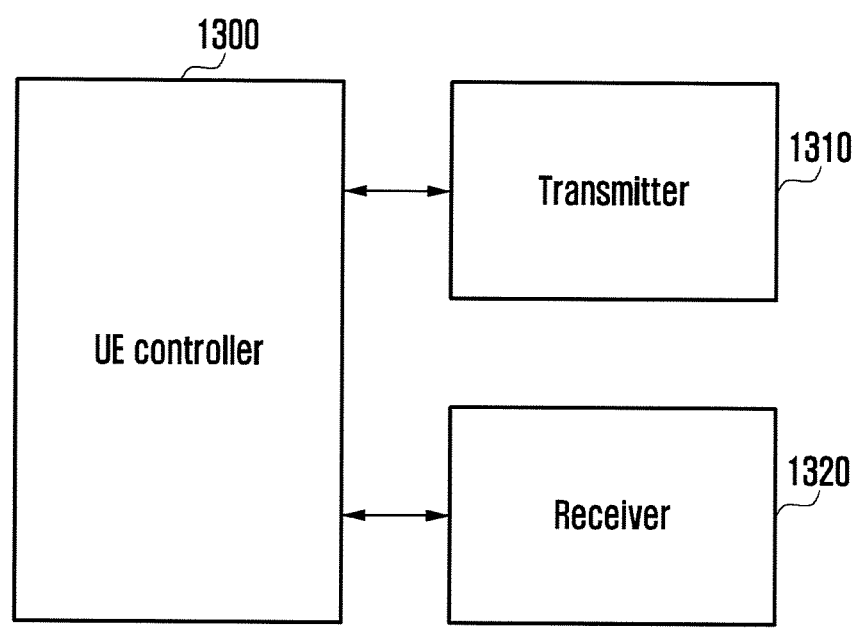
FIG. 13 is a block diagram illustrating a UE according to an embodiment of the present disclosure.

FIG. 13 is a block diagram illustrating a UE according to an embodiment of the present disclosure.

Referring to FIG. 13, a UE according to an embodiment of the present disclosure can include a communication unit 1350; 1310 and 1320, and a UE controller 1300 for controlling an overall operation of the UE.

The UE controller 1300 of the UE controls the UE to perform one operation of the above-described embodiments. For example, the UE controller 1300 can make a control to receive a higher layer control message including probability information of a modulation scheme for an interference signal from the eNB and perform error-correcting coding using a probability value of a modulation scheme for an interference signal included in the higher layer control message. Further, the UE controller 1300 can make a control to receive RRC for the NAICS configuration and control information from the eNB using the receiver 1320 to identify PoMO information of an interference signal for specific PDSCH scheduling.

Further, the communication unit 1350 of the UE transmits/receives a signal according to one operation of the above-described embodiments. At this time, the communication unit 1350 can include a transmitter 1310 and a receiver 1320 as illustrated in FIG. 13. Further, for example, the receiver 1320 enables the UE controller 1300 to determine scheduling information of a PDSCH by performing decoding for a PDCCH/ePDCCH. The UE can receive control information related to the NAICS among the notified information using the RRC and the PDCCH/ePDCCH.

Meanwhile, exemplary embodiments of the present disclosure shown and described in this specification and the drawings correspond to specific examples presented in order to easily explain technical contents of the present disclosure, and to help comprehension of the present disclosure, but are not intended to limit the scope of the present disclosure. That is, it is obvious to those skilled in the art to which the present disclosure belongs that different modifications can be achieved based on the technical spirit of the present disclosure.

Therefore, the detailed descriptions should not be construed to be limitative in any aspect, but should be considered to be illustrative. The scope of the present disclosure should be defined by the reasonable interpretations of the appended claims, and all modifications falling within any scope equivalent to the present disclosure should be construed as being included in the scope of the present disclosure.

Although the present disclosure has been described with an exemplary embodiment, various changes and modifications can be suggested to one skilled in the art. It is intended that the present disclosure encompass such changes and modifications as fall within the scope of the appended claims.

What is claimed is:

1. A communication method for a terminal, the communication method comprising: receiving a higher layer control message comprising probability information regarding a modulation scheme for an interference signal from a base station, the probability information comprising a probability value of the modulation scheme;
   receiving a signal transmitted from the base station;
   determining a Log-Likelihood Ratio (LLR) value of the signal using the probability value of the modulation scheme; and
   performing an error-correcting coding using the LLR.

2. The communication method of claim 1, wherein performing the error-correcting coding comprises:
   receiving a physical layer control message comprising identification information of the probability information of the modulation scheme for the interference signal, from the base station;
   identifying the probability value of the modulation scheme for the interference signal, which corresponds to the identification information of the probability information of a modulation scheme of an interference signal, in the higher layer control message; and
   performing the error-correcting coding using the identified probability value of a modulation scheme.

3. The communication method of claim 1, wherein the probability information of a modulation scheme for the interference signal includes at least one of a first probability of the interference signal being modulated in quadrature phase shift keying (QPSK), a second probability of the interference signal being modulated in 16 quadrature amplitude modulation (QAM), and a third probability of the interference signal being modulated in 64QAM.

4. The communication method of claim 3, wherein the probability information of the modulation scheme for the interference signal further includes a number of possible modulation schemes of the interference signal and an index of the probability value of the modulation scheme for the interference signal.

5. The communication method of claim 1, wherein, the performing the error-correcting coding, the error-correcting coding is performed using an equation, $$LLR^{(k,i)} = \ln \frac{P(b_i = 0) \sum_{m' \in M'} \sum_{x_k \in S_i^0, x_k' \in X_{m'}} P(y_k | x_k, x_k', m') P(m')}{P(b_i = 1) \sum_{m' \in M'} \sum_{x_k \in S_i^1, x_k' \in X_{m'}} P(y_k | x_k, x_k', m') P(m')}$$

wherein $x_k$ denotes a signal transmitted to the terminal, $x_k'$ denotes an interference signal, $s_i^0$ and $s_i^1$ denote a gray mapping set for $x_k$ of all possible cases, m' denotes a modulation scheme of an interference signal, M' denotes a set of all possible modulation scheme for an interference signal x', $X_{m'}$ denotes a gray mapping set for $x_k'$ of all possible cases when modulation schemes are determined to be m', respectively, and P(m') denotes the probability value of the modulation scheme according to a modulation scheme m' of the interference signal.

6. A communication method for a base station, the communication method comprising:
   configuring probability information of a modulation scheme for an interference signal; and
   transmitting a signal and a higher layer control message including the probability information of the modulation scheme for the interference signal, to a terminal,
   wherein the probability information comprising a probability value of the modulation scheme of for the interference signal, and
   wherein the probability value of the modulation scheme is used to determine a Log-Likelihood Ratio (LLR) value of the signal.

7. The communication method of claim 6, further comprising:
   transmitting a physical layer control message comprising identification information of the probability information of the modulation scheme for the interference signal, to the terminal.

8. The communication method of claim 6, wherein the probability information of the modulation scheme for the interference signal comprises at least one of a first probability of the interference signal being modulated in quadrature phase shift keying (QPSK), a second probability of the interference signal being modulated in 16quadrature amplitude modulation (QAM), and a third probability of that the interference signal being modulated in 64QAM.

9. The communication method of claim 8, wherein the probability information of the modulation scheme for the interference signal further comprises a number of possible modulation schemes of the interference signal and an index of the probability value of the modulation scheme for the interference signal.

10. The communication method of claim 8, wherein the probability information is used to generate the interference signal by the terminal.

11. A terminal in a mobile communication system, the terminal comprising:
   a transceiver configured to transmit or receive a signal to or from a base station; and
   a controller configured to:
      receive, from the base station, a higher layer control message comprising probability information of a modulation scheme for an interference signal, the probability information comprising a probability value of the modulation scheme;
      receive, a signal transmitted from the base station;
      determine a Log-Likelihood Ratio (LLR) value of the signal using the probability value of the modulation scheme; and
      perform an error-correcting coding using the LLR.

12. The terminal of claim 11, wherein the controller is further configured to:
   receive, from the base station, a physical layer control message comprising identification information of the probability information, identify a probability value corresponding to the identification information of the probability information in the higher layer control message, and
generate the interference signal using the identified probability value.

13. The terminal of claim 11, wherein the probability information of a modulation scheme for an interference signal comprises at least one of a first probability of the interference signal being modulated in quadrature phase shift keying (QPSK), a second probability of the interference signal being modulated in 16 quadrature amplitude modulation (QAM), and a third probability value that the interference signal being modulated in 64QAM.

14. The terminal of claim 13, wherein the probability information of the modulation scheme for the interference signal further comprise a number of possible modulation schemes of the interference signal and an index of the probability value of the modulation scheme for the interference signal.

15. The terminal of claim 11, wherein the controller is further configured to perform the error-correcting coding using an equation, $$LLR^{(k,i)} = \ln \frac{P(b_i = 0) \sum_{m' \in M'} \sum_{x_k \in S_i^0, x'_k \in X_{m'}} P(y_k | x_k, x'_k, m') P(m')}{P(b_i = 1) \sum_{m' \in M'} \sum_{x_k \in S_i^1, x'_k \in X_{m'}} P(y_k | x_k, x'_k, m') P(m')}$$

wherein $x_k$ denotes a signal transmitted to the terminal, $x_k'$ denotes an interference signal, $s_i^0$ and $s_i^1$ denote a gray mapping set for $x_k$ of all possible cases, m' denotes a modulation scheme of an interference signal, M' denotes a set of all possible modulation scheme for an interference signal x' , $x_{m'}$ denotes a gray mapping set for $x_k'$ of all possible cases when modulation schemes are determined to be m', respectively, and P(m') denotes the probability value of the modulation scheme according to a modulation scheme m' of the interference signal.

16. A base station in a mobile communication system, the base station comprising:
a transceiver configured to transmit or receive a signal to or from a terminal; and
a controller configured to:
generate probability information of a modulation scheme for an interference signal; and
transmit, to the terminal, a signal and a higher layer control message comprising the probability information of the modulation scheme for the interference signal,
wherein the probability information comprising a probability value of the modulation scheme of for the interference signal, and
wherein the probability value of the modulation scheme is used to determine a Log-Likelihood Ratio (LLR) value of the signal.

17. The base station of claim 16, wherein the controller is further configured to transmit, to the terminal, a physical layer control message comprising identification information of the probability information of the modulation scheme for the interference signal.

18. The base station of claim 16, wherein the probability information of a modulation scheme for an interference signal comprises at least one of a first probability of the interference signal being modulated in quadrature phase shift keying (QPSK), a second probability of the interference signal being modulated in 16 quadrature amplitude modulation (QAM), and a third probability of the interference signal being modulated in 64QAM.

19. The base station of claim 18, wherein the probability information of the modulation scheme for the interference signal further comprises a number of possible modulation schemes of the interference signal and an index of the probability value of the modulation scheme for the interference signal.

20. The base station of claim 16, wherein the probability information is used to generate the interference signal by the terminal.

* * * * *